(12) United States Patent
Kovacich

(10) Patent No.: US 6,843,823 B2
(45) Date of Patent: Jan. 18, 2005

(54) LIQUID PHASE SINTERED BRAZE FORMS

(75) Inventor: William L. Kovacich, Farragut, TN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/175,955

(22) Filed: Jun. 21, 2002

(65) Prior Publication Data

US 2003/0062396 A1 Apr. 3, 2003

Related U.S. Application Data

(60) Provisional application No. 60/325,171, filed on Sep. 28, 2001.

(51) Int. Cl.⁷ .................................................. C22C 1/04
(52) U.S. Cl. ........................ 75/231; 75/245; 228/56.3; 228/101; 419/5; 419/47
(58) Field of Search .......................... 75/231, 245, 246; 419/5, 47, 40–43; 228/56.3, 101, 122.1

(56) References Cited

U.S. PATENT DOCUMENTS

| 3,390,986 A | * | 7/1968 | Stenerson ..................... 419/19 |
| 3,520,704 A | | 7/1970 | Goodman |
| 3,716,347 A | | 2/1973 | Bergstrom et al. |
| 3,717,442 A | | 2/1973 | Knopp |
| 3,809,553 A | | 5/1974 | Peaslee |
| 3,889,349 A | | 6/1975 | Kaufman |
| 4,003,715 A | * | 1/1977 | Cascone ..................... 428/555 |
| 4,029,476 A | | 6/1977 | Knopp |
| 4,078,713 A | | 3/1978 | Marshall |
| 4,277,544 A | | 7/1981 | Pietrocini |
| 4,289,833 A | | 9/1981 | Hachisuka |
| 4,386,959 A | | 6/1983 | Frehn |
| 4,410,604 A | | 10/1983 | Pohlman et al. |
| 4,541,876 A | | 9/1985 | Hwang |
| 4,690,320 A | * | 9/1987 | Morishita et al. ........... 228/194 |
| 4,775,414 A | | 10/1988 | Shoji |
| 5,156,321 A | | 10/1992 | Liburdi et al. |
| 5,273,710 A | | 12/1993 | Zengin |
| 5,466,277 A | | 11/1995 | Miura et al. |
| 5,561,827 A | * | 10/1996 | Reeves et al. ................. 419/5 |
| 5,654,106 A | | 8/1997 | Purnell et al. |
| 5,791,551 A | | 8/1998 | Parks et al. |
| 6,428,595 B1 | * | 8/2002 | Hayashi et al. ............... 75/246 |

FOREIGN PATENT DOCUMENTS

| EP | 0 270 785 | 6/1988 |
| GB | 1017650 | 1/1966 |

* cited by examiner

Primary Examiner—Ngoclan T. Mai
(74) Attorney, Agent, or Firm—Finnegan, Henderson, Farabow, Garrett & Dunner; Stanley M Hanley

(57) ABSTRACT

A braze preform and a method for making the braze preform are disclosed. The braze preform includes a filler metal that has been sintered to produce a liquid phase of at least a portion of the filler metal.

14 Claims, 4 Drawing Sheets

LIQUID PHASE SINTERED BRAZE FORMS

CROSS-REFERENCE TO RELATED APPLICATION

This application claims priority from U.S. Provisional Patent Application Ser. No. 60/325,171 filed Sep. 28, 2001.

TECHNICAL FIELD

The present invention relates to the process of joining components by brazing, and more particularly to a method and apparatus for brazing metal components produced by powder metallurgy.

BACKGROUND

Due to advances in materials and manufacturing process, fabricating components using powder metallurgy ("P/M") techniques is becoming increasingly more widespread as an alternative to other metalworking technologies. P/M provides the capability of forming high quality components to close tolerances in an economical fashion. Since P/M techniques can be easily automated to produce net-shape or near net-shape components having complex shapes, fabrication by P/M techniques often increases cost savings, precision, productivity, and materials conservation.

Although P/M encompasses many fabrication techniques, these techniques typically include the processes of forming a "green" part and sintering. A green part is a structure that can be formed by a variety of methods, including by compacting a powder in a die and by mixing a powder with a binder that allows the mixture to be injection molded in a manner similar to injection molding of plastics. Although the green part resulting from compaction or injection molding has a well-defined geometric shape, it lacks desired properties, such as, for example, strength, toughness, and porosity, of the final component. The desired properties are produced by a heating process, known as sintering. The green part is sintered at a temperature below the melting temperature of the main constituent of the powder to generate metallurgical bonds between the powder particles without distorting the shape of the component. Once sintering is completed, the component can be further treated, if necessary, by secondary operations, such as, for example, oil impregnation, resin impregnation, dipping, machining, and assembly.

Assembling P/M components presents unique challenges when the P/M components must be joined to one another or to non-P/M materials, such as, for example, wrought or cast materials. Brazing is a group of processes that uses a filler metal to join components. The filler metal typically has a melting temperature above 450° C., but below the melting temperature of the base materials of the components to be joined. As the filler metal is heated, it is drawn into the joint between the components by capillary action. P/M components can be joined by brazing either after sintering or during the sintering process. Due to the porosity of the P/M component, however, the capillary action that draws the molten filler metal into the joint also draws the molten filler material away from the joint and into the pores of the P/M component. This results in excessive infiltration and poor joint quality.

A powder filler metal disclosed in U.S. Pat. No. 3,717,442 attempts to overcome the problem of excessive infiltration into P/M components. This filler metal is, however, brittle and difficult to cold work into useful preform shapes. As a result, preforms of this braze powder must be of substantial bulk to withstand handling prior to brazing. In joints where excess filler metal compromises the quality of the assembly, such as, for example, weeping into splines, slugs of this filler metal can be formed and placed at precise intervals in the joint. These slugs, however, can cause intermittent and poor quality joints if braze flow is erratic. Additionally, placing the slugs at the correct intervals is more labor intensive than the use of a preform shape, such as, for example, a braze ring.

Thus, there is a need to overcome these and other problems of the prior art and to provide a braze preform suitable for brazing where at least one of the components to be joined is a P/M component. The present invention, as illustrated in the following description, is directed to solving one or more of the problems set forth above.

SUMMARY OF THE INVENTION

In accordance with an aspect of the present invention, a method for making a braze preform is disclosed. The method includes providing a filler metal in powder form, wherein the filler metal includes at least one metal powder. The filler metal is sintered at a temperature to produce a liquid phase of a portion of the at least one metal powder.

In accordance with another aspect of the present invention, a braze preform is disclosed. The braze preform includes a filler metal. The braze preform has been sintered to produce a liquid phase of at least a portion of the filler metal.

In accordance with yet another aspect of the present invention, a method for brazing a powder metallurgy component to another component is disclosed. The method includes providing a braze preform including at least a filler metal powder, wherein the braze preform has been sintered to produce a liquid phase of at least some of the filler metal powder. The braze preform is placed at a location proximate to a joint between the powder metallurgy component and the another component, wherein the location allows a liquid state of the filler metal to be drawn into the joint. The braze preform is heated to provide the liquid state of the filler metal powder.

DESCRIPTION

In the following description, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that changes may be made without departing from the scope of the present invention. The following description is, therefore, not to be taken in a limited sense.

As used herein, the term "P/M" is synonymous and interchangeable with the term "powder metallurgy." When no distinguishing term is used in conjunction with the term "P/M component," "P/M component" means a sintered component, a partially sintered component, and/or a pre-sintered component. Where intended, distinguishing terms will be used including "sintered," "partially sintered," "pre-sintered," and "green." As used herein, the term "green braze preform" means an amount of filler metal that has not been sintered, but having a definite shape, such as, for example, compacted filler metal after removal from a die or filler metal mixed with a binder after removal from a mold.

Figure 1A:
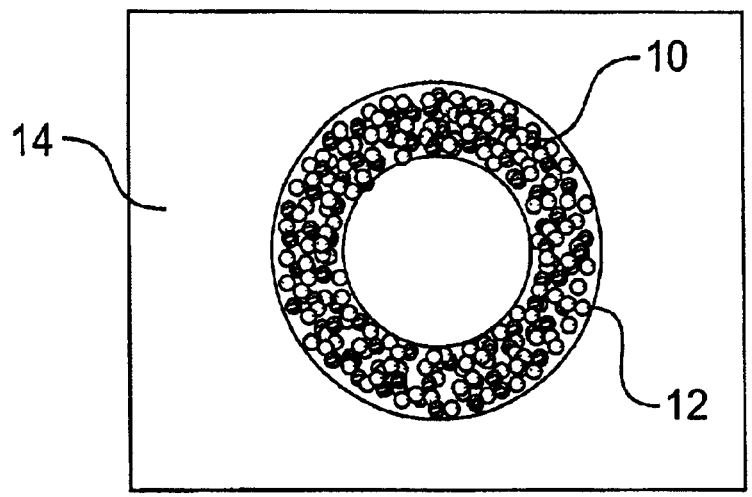
FIG. 1A is a diagrammatic top view of a filler metal in a preform die in accordance with an exemplary embodiment of the present invention.

With reference to FIGS. 1A–D, a method for making an effectively sized braze preform for joining P/M components that avoids excessive filler metal in accordance with one exemplary embodiment of the present invention is depicted. As shown in FIG. 1A, a powdered filler metal 10 suitable for brazing P/M components is placed in die cavity 12 of die 14. An example of a suitable filler metal for brazing P/M components is an alloy powder known under the trade name "Ancorbraze 72." The composition of Ancorbraze 72 includes Cu, Ni, Mn, Si, and B. Ancorbraze 72 may also be blended with Fe powder to form a filler metal. The amount of filler metal 10 placed into die cavity 12 is based on the joint design and the method of assembly. This amount is sufficient to produce a braze preform that effectively joins the desired components without excessive filler metal that can compromise joint quality. A flux (not shown) can be added to filler metal 10 to exclude oxide and nitride forming gasses from the joint during brazing. Lubricants (not shown) can also be added to filler metal 10, if necessary, to reduce friction between a punch and the filler metal as well as to facilitate removal of the compacted preform from the die.

Figure 1B:
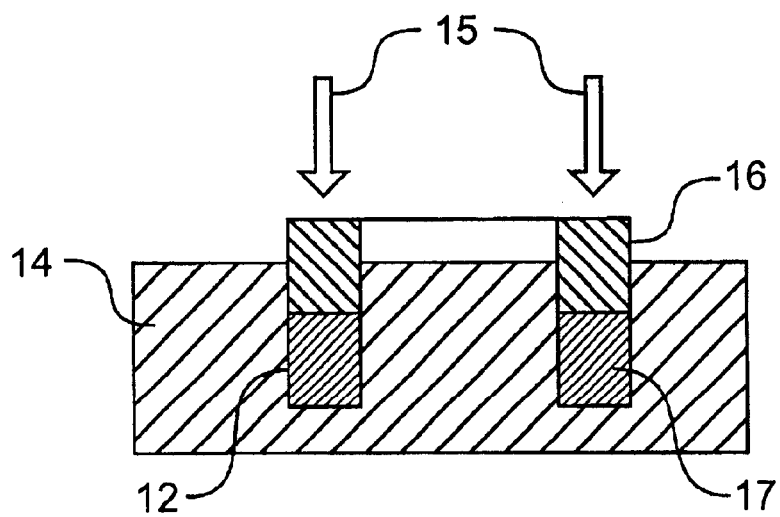
FIG. 1B is a diagrammatic cross-section of a punch compacting the filler metal to form a green braze preform in accordance with an embodiment of the present invention.

With reference to FIG. 1B, green braze preform 17 is formed by mechanically compacting the filler metal. Compacting the filler metal is accomplished by punch 16 pressing the filler metal in die cavity 12 in a direction represented by arrows 15. Once compacted, green braze preform 17 is removed from die 14.

Although a mechanical compacting method for forming green braze preform 17 is disclosed, the green braze preform can be formed by any method known in the art that produces a net or near net shaped structure including, but not limited to, injection molding, isostatic pressing, extrusion, spray forming, slip casting, roll compacting, thermal spray forming, and casting in the presence of a binder.

Figure 1C:
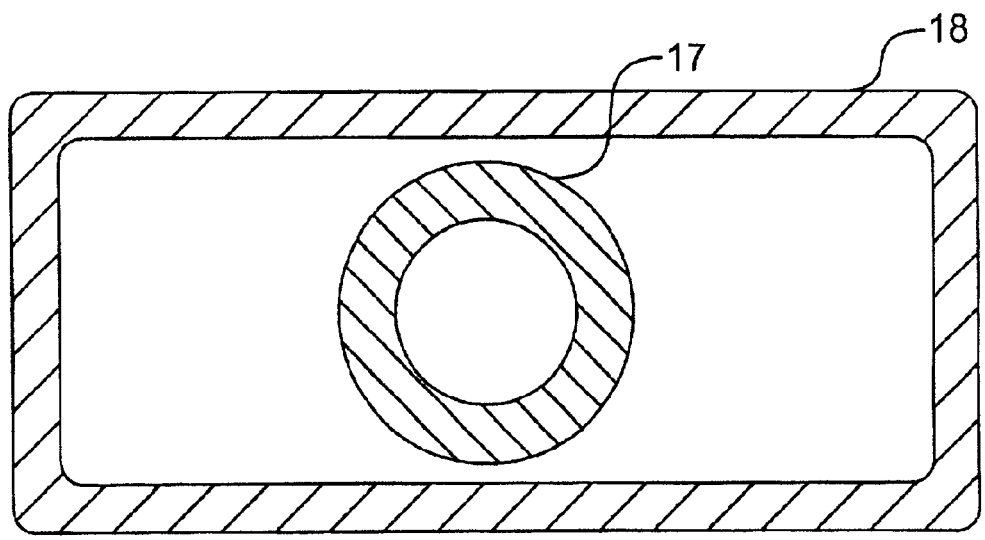
FIG. 1C is a diagrammatic top view of liquid phase sintering a green braze preform.
Figure 1D:
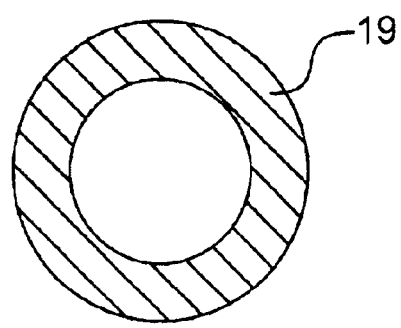
FIG. 1D depicts a braze preform in accordance with an exemplary embodiment of the present invention.

Green braze preform 17 is then subject to a liquid phase sintering process as depicted in FIG. 1C. Green braze preform 17 is heated in furnace 18 having a controlled atmosphere for a time and to a temperature that produces the liquid phase of at least a portion of one of the alloys of the filler metal. The atmosphere can be any atmosphere suitable for liquid phase sintering such as, for example, air, nitrogen plus an endothermic gas, or hydrogen gas plus nitrogen gas. The time and temperature of liquid phase sintering should be sufficient to produce a portion of liquid phase that is small enough to be held by capillary force within the remaining solid phase so that the resultant braze preform substantially retains the shape of green braze preform 17. Insufficient liquid phase sintering time and/or temperature results in a braze preform lacking the strength to withstand handling and transportation. Excessive liquid phase sintering time and/or temperature can result in a braze preform that fails to substantially retain the shape of the green braze preform. Liquid phase sintering temperature of a filler metal comprising a Cu—Mn—Ni based alloy powder can be from about 940° C. to 1000° C.

Alternatively, braze preform 17 can be formed without first forming a green braze preform. In this embodiment, filler metal is placed into cavity 12. Die 14 (also know as a "mold" in this embodiment), including the filler metal in cavity 12, is then put into furnace 18. Thus, filler metal is liquid phase sintered while still in cavity 12 without forming a green braze preform.

After liquid phase sintering and, if necessary, cooling, braze preform 19 can be used in a brazing process to join components. Braze preform 19 is depicted as ring shaped in FIG. 1D, but can be made into any shape. As known by those with skill in the art, the size and shape of the braze preform depends on several factors including the joint design and the method of assembly. The size of the braze preform should be large enough to join the desired components with sufficient strength, but small enough to prevent excess braze material. Because joint design and methods of assembly are known by those with skill in the art, this disclosure provides only examples of joint design and methods of assembly. The scope of the present invention, however, is not limited by the disclosed examples.

Figure 2:
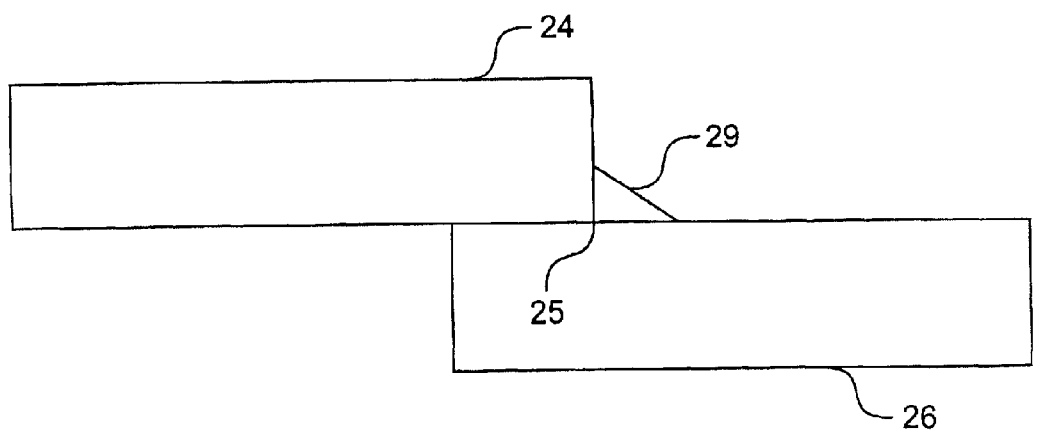
FIG. 2 is a diagrammatic illustration of a method of brazing two components in accordance with an exemplary embodiment of the present invention.

A method of brazing in accordance with an embodiment of the present invention is depicted in FIG. 2. A lap joint 25 is formed by components 24 and 26. Components 24 and 26 are P/M components. As discussed above, braze preform 29 includes a liquid phase sintered filler metal suitable for brazing P/M components. In one embodiment of the method of the present invention, components 24 and 26 are sintered P/M components and braze preform 29 is placed proximate to joint 25, so that when melted, liquid filler metal is drawn into joint 25. Braze preform 29 can be melted by a variety of methods. These methods include furnace, torch, induction, dip, and electron beam methods.

In another embodiment of the present invention, components 24 and 25 are green or partially sintered. In this case, brazing can be done in a sintering furnace as components 24 and 26 are sintered.

In yet another embodiment of the present invention, component 24 is a P/M component and component 26 is a non-P/M component. In this case, braze preform 29 can be melted by any of the previously disclosed methods.

Figure 3:
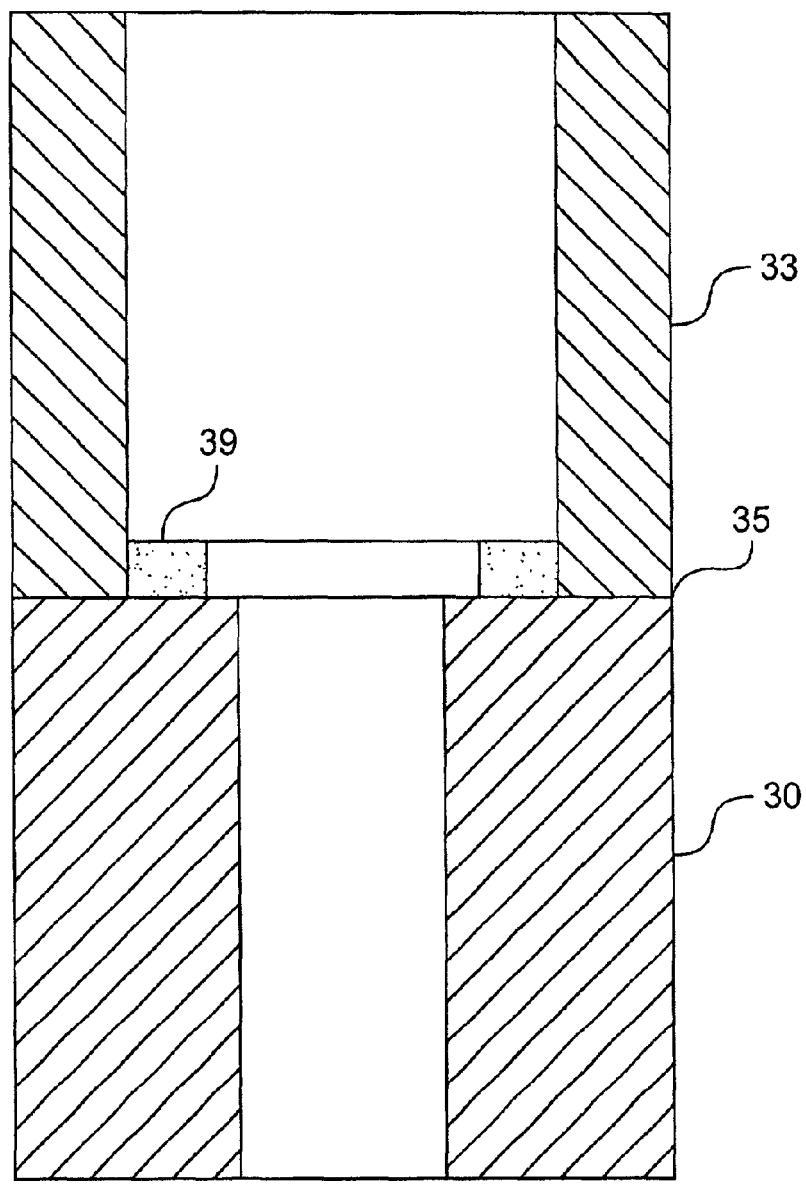
FIG. 3 is a cross-sectional view illustrating brazing of two components to form a portion of a countershaft transmission hub in accordance with an exemplary embodiment of the present invention.

Referring to FIG. 3, an exemplary embodiment is disclosed in which a braze preform can be used to braze two P/M components to form a portion of a countershaft transmission hub for a backhoe loader. A first green P/M component 30 and a second green P/M component 33 are formed using powdered metal such as, for example, MPIF grade FC-0208, by methods know to those of skill in the art. First green P/M component 30 is a cylinder having an outside diameter (OD) of about 112 mm and an inside diameter (ID) of about 70 mm. Second green P/M component 33 is a cylinder having an OD of about 112 mm and an ID of about 97 mm.

Braze preform 39 is formed, for example, by compacting a filler metal into a ring shaped green braze preform. Filler metal can be, for example, Ancorbraze 72. The green braze preform is then sintered to produce a liquid phase of at least a portion of the alloy powder. Liquid phase sintering can be in a neutral atmosphere at a temperature of about 940° C. to about 1000° C. Liquid phase sintering time can vary from about 5 minutes to about 15 minutes, but should be sufficient to produce a liquid phase that is small enough to be held by capillary force within the remaining solid phase so that the resultant braze preform substantially retains the shape of green braze preform. Resultant braze preform 39 has an OD of about 96 mm, a weight of about 8 grams, and sufficient strength to withstand handling and transportation.

As shown in FIG. 3, an assembly 31 is formed by placing an end of first green P/M component 30 against an end of second green P/M component 33 to form a joint 35. Braze preform 39 is placed on the end of first green P/M component 30 and within the inner diameter of second green P/M component 33.

Assembly 31 is then placed in a furnace to undergo, for example, a four step process for sintering and brazing. The furnace atmosphere can be a neutral atmosphere, such as, for example, nitrogen plus an endothermic gas or hydrogen gas plus nitrogen gas. In a first step, the furnace temperature is about 785° C. for a time sufficient to burn off any lubricant used to facilitate removal of first green P/M component 30 and second green P/M component 33 from a compacting die. In a second step, the furnace temperature is raised to a high heat temperature of about 1040° C. to about 1140° C. Brazing generally begins during the second step as the furnace temperature is raised to a temperature sufficient to begin melting liquid phase sintered braze preform 39.

In a third step, assembly 31 is held at the high heat temperature for about 30 to about 40 minutes to permit sintering of the first and second P/M components. In a fourth step, the brazed assembly is cooled at a rate dependant on the desired properties. As one of skill in the art would recognize, cooling can be slow, rapid, or at any rate in between to achieve the desired properties.

Alternative embodiments will become apparent to those skilled in the art to which the present invention pertains without departing from its spirit and scope.

Industrial Applicability

The braze preform and the method for making the braze preform of the present invention finds use in, for example, the manufacturing industry. The braze preform and method for making it have wide application in any industry in which P/M components are joined to one another or to components produced by other metalworking techniques to form assemblies.

Thus, the present invention provides a method for brazing P/M components that avoids excess filler metal, intermittent joints, and poor quality joints. The method accomplishes this by the use of a braze preform effectively sized and including a filler metal that avoids excessive infiltration into pores of the components and away from the joint.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A braze preform comprising:
   a filler metal, wherein the braze preform has been sintered to produce a liquid phase of at least a portion of the filler metal,
   wherein the filler metal further includes at least one of a flux and a lubricant.

2. The braze preform of claim 1, wherein the filler metal includes an alloy powder comprising Cu, Mn, and Ni.

3. The braze preform of claim 2, wherein the filler metal further includes Fe powder.

4. The braze preform of claim 1, wherein the filler metal is sintered in an atmosphere of nitrogen.

5. The braze preform of claim 1, wherein the filler metal is sintered at a temperature of about 940° C. to about 1000° C.

6. A method for brazing a powder metallurgy component to another component comprising:
   providing a braze preform including at least a filler metal powder, wherein the braze preform has been sintered to produce a liquid phase of at least some of the filler metal powder;
   placing the braze preform at a location proximate to a joint between the powder metallurgy component and the another component, wherein the location allows a liquid state of the filler metal to be drawn into the joint; and
   heating to provide the liquid state of the filler metal powder.

7. The method of claim 6, wherein the powder metallurgy component is one of a green powder metallurgy component and a partially sintered powder metallurgy component.

8. The method of claim 6, wherein the another component is one of a green powder metallurgy component, a partially sintered powder metallurgy component, and a sintered powder metallurgy component.

9. The method of claim 6, further including sintering at least one of the powder metallurgy component and the another component.

10. The method of claim 6, wherein the another component is not a powder metallurgy component.

11. The method of claim 6, wherein the braze preform includes an alloy powder comprising Cu, Mn, and Ni.

12. The method of claim 6, wherein the braze preform further includes Fe powder.

13. The method of claim 6, wherein heating to provide the liquid state of the filler metal powder is accomplished by heating at least the powder metallurgy component and the another component.

14. The method of claim 6, wherein heating to provide the liquid state of the filler metal powder is accomplished by heating a portion of at least the powder metallurgy component and the another component.

* * * * *